(No Model.)

L. C. CARY.
MULTIPLE GEARING.

No. 595,694. Patented Dec. 21, 1897.

WITNESSES
A. B. Diggs
E. E. Masson

INVENTOR
Lewis C. Cary.
by Watson & Co.,
Attorneys

UNITED STATES PATENT OFFICE.

LEWIS C. CARY, OF EL PASO, TEXAS, ASSIGNOR OF TWO-THIRDS TO T. H. CONKLIN AND C. R. MOREHEAD, OF SAME PLACE.

MULTIPLE GEARING.

SPECIFICATION forming part of Letters Patent No. 595,694, dated December 21, 1897.

Application filed July 29, 1897. Serial No. 646,310. (No model.)

*To all whom it may concern:*

Be it known that I, LEWIS C. CARY, a citizen of the United States, residing at El Paso, in the county of El Paso and State of Texas, have invented certain new and useful Improvements in Multiple Gearing; and I do hereby declare the following to be a full, clear, and exact description of the invention, such as will enable others skilled in the art to which it appertains to make and use the same.

This invention relates to improvements in a multiple gearing for bicycles, vehicles, locomotive-engines, traction devices, &c.

An object of the invention is to so apply such multiple gearing to such class of machines as to obtain greater speed and power for the expenditure of a certain amount of energy than is obtained by many devices now in use.

A further and special object is to apply these improvements to an ordinary bicycle with slight changes made in the construction of the rear wheel, while utilizing chain-gearing, ball-bearings, and improvements now in use on such machines.

The invention consists in further detailed improvements, which will be more fully pointed out in the specification and claims.

For a full and complete understanding of my invention reference is to be had to the accompanying drawings, wherein corresponding letters indicate like parts in both views, and in which—

Figure 1:
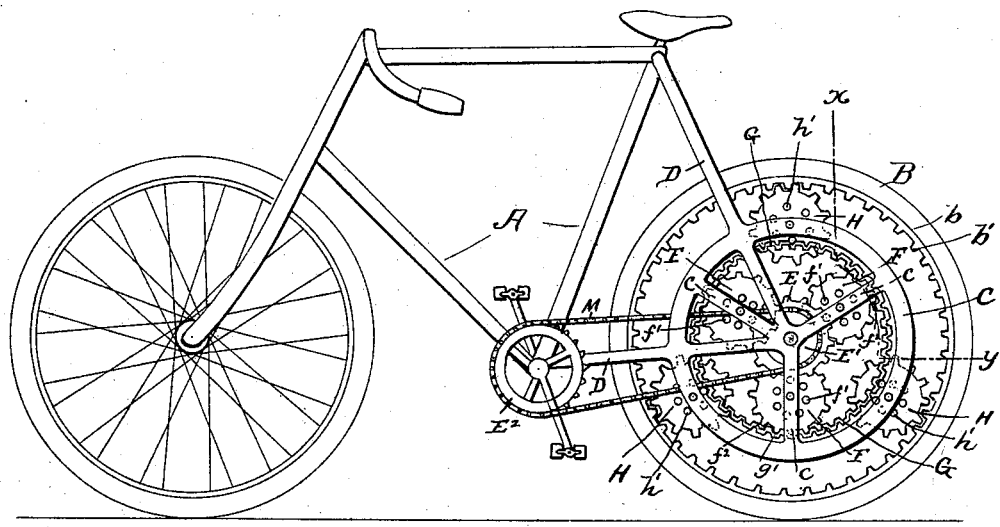
Figure 2:
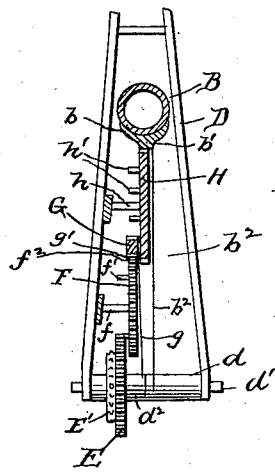

Figure 1 is a view in side elevation of a bicycle embodying the improved multiple gearing. Fig. 2 is a rear sectional view of the upper part of the rear wheel of the bicycle, illustrating the arrangement of the gearing on the rear axle of the wheel.

In the drawings, A refers to a bicycle of usual construction, excepting the gearing of the rear wheel.

B refers to the rear wheel, having a rim $b$ of usual form, either of metal or wood, and a cog-rim $b'$ near the middle inner portion thereof, as shown in Fig. 2, and spokes $b^2$, suitably secured to this rim at the side of the cog-rim and extending to sleeve $d$, to which they are secured in any improved manner, said sleeve $d$ being mounted on ball-bearings upon axle $d'$ in any suitable manner. Sleeve $d$ only extends over part of the rear axle, and adjacent to its inner end is a second sleeve $d^2$ for supporting a gear-wheel, hereinafter referred to, this second sleeve being similarly mounted on said axle. At the side of sleeve $d^2$ there is mounted upon said axle in a rigid manner to revolve therewith a gear-wheel E, and upon the outer side of this gear-wheel and secured to revolve therewith is a suitable sprocket-wheel E', over which an ordinary driving-chain M runs from the pedal sprocket-wheel $E^2$ to propel the wheel in the usual manner.

C refers to a framework of circular form and of about half the diameter of the wheel, which is secured to or forms part of the rear tubular framework D of the bicycle and which is secured to and lies practically in the same plane with the left-hand parts of the same, as shown in Fig. 1. $c$ are small strengthening ribs or spokes extending from equidistant points of the circumference of this frame to and forming part of the juncture of the rear ends of the tubular frame D on the left-hand side of the machine, as shown, and are preferably three in number.

F are similar-shaped gear-wheels mounted loosely to revolve upon the inner end of shafts $f$ about equidistant from the ends of spokes $c$, and said wheels lie in the same plane slightly inside of the plane of wheel E and have projecting lugs or pins $f'$ upon their outer surfaces near their circumference which are engaged by the teeth or cogs of wheel E to simultaneously revolve wheels F.

G is a gear-wheel having teeth or cogs upon both its outer circumference and inner surface, as shown, is wider, and lies in the same plane as wheels F. This wheel is supported in place by means of spokes $g$, extending from its inner side to a sleeve $d^2$, before referred to, in a manner similar to which bicycle-wheels are usually mounted upon an axle, and the cogs or teeth $g'$ upon its inner surface mesh with teeth $f^2$ upon the circumference of wheels F.

H are gear-wheels similar to wheel G and are mounted in the circumference of frame C, equidistant apart and alternately in respect to wheels F and upon the inner shafts $h$ in a plane inside of the plane of wheel G, so as to permit pins or lugs $h'$ upon its outer surface to engage the teeth of wheel G and also to bring the teeth or cogs upon their circumferences into mesh with the teeth or cogs upon the inner surface of the rim $b'$ to form a complete system of gearing from the pedal sprocket-wheel to revolve the wheel.

In the operation of the device power is applied to the pedals of the wheel in the usual manner and is transmitted in turn through the intermediate chain of gearing to the cogged or toothed surface on the rim of the wheel to revolve the same.

I am aware that similar trains of gearing have heretofore been used, but not of this especial construction and manner of arrangement and mounting. Therefore I do not claim such a train of gearing broadly.

What I do claim, and desire to secure by Letters Patent, is—

1. A multiple gearing for bicycles, vehicles, and traction devices, comprising a framework, an axle mounted therein, a traction-wheel having an inner cogged rim, mounted upon said axle by means of spokes connecting said rim with a sleeve upon said axle, a sprocket and gear wheel secured together and rigidly mounted upon said axle to revolve with the same, an endless chain connecting said sprocket-wheel with a motive power to revolve the same, a series of gear-wheels mounted upon one side of said framework, equidistant apart, and having pins or lugs to mesh with the first gear-wheel, and provided with cogs or teeth upon their outer circumferences, a gear-wheel having teeth or cog surfaces upon its exterior and interior surfaces, mounted upon a sleeve upon said axle, adjacent to the first sleeve and between the latter and the first sprocket-wheel, a series of gear-wheels mounted in said framework, at points equidistant, and beyond the circumference of the last-mentioned wheel, and having pins or lugs upon their outer surfaces engaging the teeth upon the circumferences of the latter wheel, said latter series of wheels having teeth meshing with teeth upon said rim of the traction-wheel, substantially as described and set forth.

2. A multiple gearing for a bicycle comprising a framework, a traction-wheel having a cogged rim upon its inner surface, an axle having two loose sleeves $d$, $d^2$ mounted thereon adjacent to each other, said traction-wheel being supported on sleeve $d$, and two rigid wheels secured together and locked to revolve with said axle, one of said wheels being a sprocket-wheel connected by an endless chain with a motive power, and the second wheel meshing with a series of wheels mounted, equidistant apart in the side of said framework adjacent to said sprocket-wheel, a second gear-wheel having teeth or cogs upon both its exterior and interior surfaces, mounted upon sleeve $d^2$ by means of spokes, said second gear-wheel meshing with said series of wheels, a second series of gear-wheels mounted near the circumference of said framework, equidistant apart, and alternately with respect to the first series of wheels, said second series meshing with gear-wheel G, and the latter series having teeth or cogs in mesh with teeth or cogs upon the rim of said traction-wheel, substantially as described and set forth.

In testimony whereof I affix my signature in presence of two witnesses.

LEWIS C. CARY.

Witnesses:
JAMES H. WHITE,
H. R. WOOD.